United States Patent [19]

Berst et al.

[11] 4,127,621
[45] Nov. 28, 1978

[54] QUENCHING DEVICE

[75] Inventors: Albert H. Berst; Richard L. Kline; William A. Medcalf; James H. Onnen, all of Louisville; Philipp P. Schupp, La Grange, all of Ky.

[73] Assignee: American Air Filter Company, Inc., Louisville, Ky.

[21] Appl. No.: 821,728

[22] Filed: Aug. 4, 1977

[51] Int. Cl.$^2$ ............................................. B01D 47/06
[52] U.S. Cl. ...................................... 261/118; 55/223; 55/240; 55/260; 261/DIG. 9
[58] Field of Search ..................... 261/79 A, 112, 115, 261/DIG. 9, DIG. 54; 55/220, 240, 241, 260, 228, 238, 223; 202/258

[56] References Cited
U.S. PATENT DOCUMENTS

| 2,259,034 | 10/1941 | Fisher | 261/79 A X |
|---|---|---|---|
| 3,309,286 | 3/1967 | Alderman | 202/258 |
| 3,618,908 | 11/1971 | Stone | 261/DIG. 54 |
| 3,628,311 | 12/1971 | Costarella et al. | 261/118 X |
| 3,696,590 | 10/1972 | Richmond | 261/DIG. 54 |
| 3,876,399 | 4/1975 | Saponaro | 55/228 |
| 3,960,992 | 6/1976 | Cyrenne | 261/DIG. 9 |
| 3,966,438 | 6/1976 | Nicholson | 55/238 |
| 4,067,707 | 1/1978 | Atsukawa et al. | 261/112 X |

Primary Examiner—Richard L. Chiesa

[57] ABSTRACT

A quenching device for a hot, dirty gas stream, the quenching device being disposed between a flow-through duct carrying a hot, dirty gas stream and a housing to treat the gas, the quenching device including a pair of cooling water sources in parallel transversing the gas stream. The quenching device further includes means to prevent dirt build-up at the entrance of the housing due to entrainment of the dirt in the cooling water flowing through the gas stream.

3 Claims, 11 Drawing Figures

QUENCHING DEVICE

BACKGROUND OF THE INVENTION

(1) Field of the Invention

This invention relates to quenching devices and more particularly relates to quenching devices for a hot, dirty gas stream with means to provide a water curtain of uniform density across the gas stream.

(2) Description of the Prior Art

In various industrial facilities in the metallurgical and other arts, numerous arrangements have been utilized to cool hot, dirty gases prior to scrubbing of the gases or subjecting the gases to other treatments in order to remove the dirt from the gas stream. In many applications, the gas is brought into direct contact with cooling water, the cooling water generally being sprayed directly into the gas stream in order to obtain a uniform cooling contact across the stream. However, because of the solids in the gas stream, nozzles in the spraying system become plugged and have to be replaced, usually requiring shutdown, and the solids generally build-up along the lower surfaces of the device where introduced.

In the prior art several references are noted which relate to spraying of dirty gas streams entering a scrubbing or other treating device. These include: U.S. Pat. No. 1,176,747; U.S. Pat. No. 782,190; U.S. Pat. No. 3,552,727; U.S. Pat. No. 3,550,356; U.S. Pat. No. 3,516,647; U.S. Pat. No. 2,853,152; U.S. Pat. No. 2,259,034; U.S. Pat. No. 2,259,033; U.S. Pat. No. 3,966,438; U.S. Pat. No. 3,876,399; U.S. Pat. No. 3,710,555; and U.S. Pat. No. 1,734,677.

SUMMARY OF THE INVENTION

The present invention provides an improved gas quenching device which is straightforward in construction, operation and maintenance, providing efficient cooling of hot, dirty gas streams at a minimum of cost in an air cleaning system. In addition, the present invention provides a gas cooling device which permits a uniform density of cooling water sprayed into a hot, dirty gas stream. Furthermore, the device of the present invention provides a means for preventing build-up of solids within the cooling area of an air treating device when the gas stream is sprayed with cooling water.

Various other features of the present invention will become obvious to those skilled in the art upon reading the disclosure set forth hereinafter.

More particularly, the present invention provides a quenching device for a hot, dirty gas stream comprising: a housing having a gas inlet and a gas outlet; a flow-through duct in fluid communication with the gas inlet at one end and a hot, dirty gas source at the opposed end; the housing having a transversely disposed cooling water source means mounted along the top thereof, the cooling water source including means to provide a water curtain of uniform density across the housing; and, the housing including a lower wall disposed beneath a lower wall of the duct with a vertically extending baffle connecting the lower wall of the housing to the lower wall of the duct, the lower wall of the housing communicating with the gas outlet.

It is to be understood that various changes can be made in the arrangement, form, and construction of the apparatus disclosed herein without departing from the scope or spirit of the present invention.

BRIEF DESCRIPTION OF THE DRAWING

Referring to the drawing which discloses several advantageous embodiments of the present invention and modifications thereto.

DESCRIPTION OF THE PREFERRED EMBODIMENT

Figure 1:
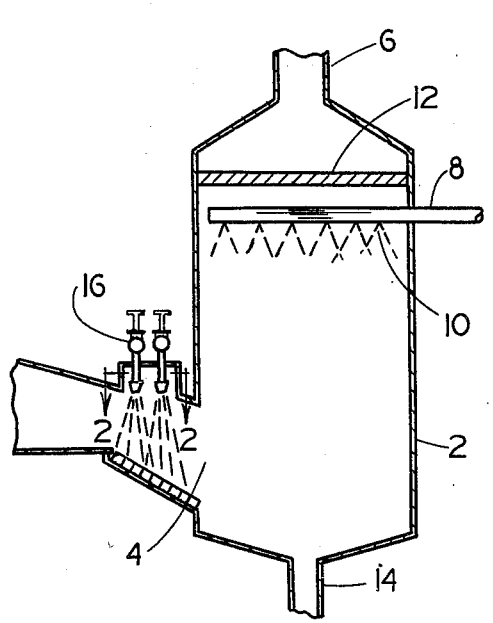
FIG. 1 is an elevational view of a wet gas scrubbing unit including one preferred quenching device of the present invention.

Referring now to the drawing, as shown in FIGS. 1, 2, 3 and 4, a vertically extending waste gas scrubbing tower 2 for cleaning a dirty gas stream is provided with an inlet 4 for receiving waste or dirty gases therethrough and a clean gas outlet 6. The waste gas scrubber 2 is further provided with a spraying solution header 8 having a plurality of nozzles 10 therein to spray either water or a reacting solution into the gas stream as it passes through the scrubber 2. A mist eliminator 12 is generally provided to prevent entrainment of solution leaving with the cleaned gas through the outlet 6. A slurry discharge 14 is also provided for removal of the slurry which is formed by the contacting of the solid particulates in a gas stream by the solution sprayed from nozzles 10 as well as the slurry resulting from the quenching of the inlet hot gases at a quenching device 16, to be discussed hereinafter.

Figure 2:
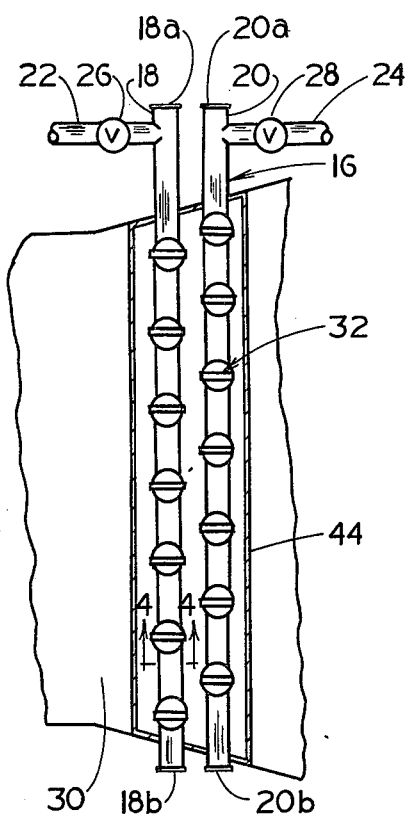
FIG. 2 is a fragmentary, enlarged, sectional view of the quenching device of FIG. 1 taken substantially along line 2—2 of FIG. 1.
Figure 4:
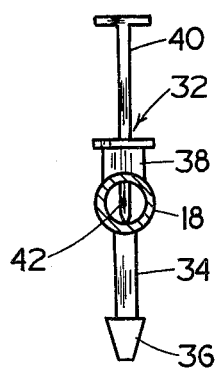
FIG. 4 is a fragmentary, enlarged, sectional view taken substantially along line 4—4 of FIG. 2.
Figure 3:
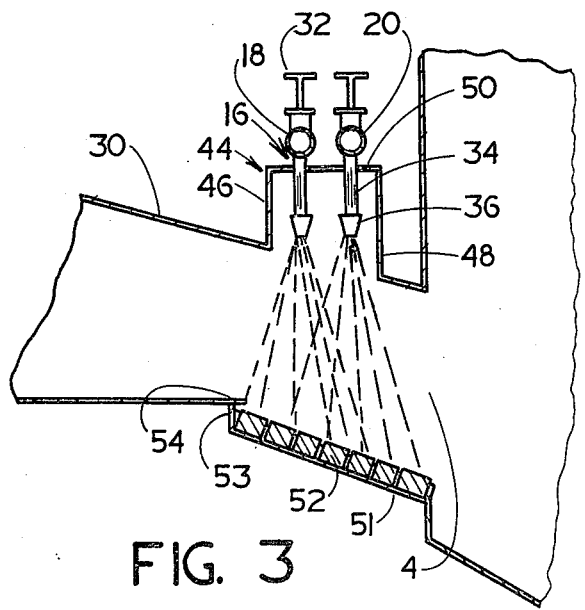
FIG. 3 is an elevational view of FIG. 2.

In FIGS. 2, 3 and 4 the quenching device 16 is shown, the quenching device 16 including a pair of spray headers 18 and 20, respectively. Spray headers 18 and 20 are in flow communication with cooling water conduits 22 and 24 respectively, conduits 22 and 24 being in flow communication with a cooling water source (not shown). Valves 26 and 28 are provided in the conduits 22 and 24, respectively, valves 26 and 28 being disposed for controlling flow through the headers 18 and 20 or for removing one of the headers 18 or 20 from service, shutdown of the quenching headers 18 and 20 being discussed hereinafter.

The headers 18 and 20 extend transversely of the quenching device 16 and a plurality of nozzle assemblies 32 are disposed therein to provide a uniform spray or a water curtain substantially across the flow of gases entering the quenching device 16 through the conduit 30. Headers 18 and 20 are also provided with flanges 18a and 18b and 20a and 20b on each end thereof. Flanges 18a and b, and 20a and b are provided for easy removal and clean-out of headers 18 and 20.

The nozzle assemblies 32 include a downwardly extending conduit portion 34 with a nozzle 36 at the lower extremity thereof. The upper portion of the assembly 32 includes a collar 38 with a cleaning rod 40 extending down through an opening therein, rod 40 being in axial alignment with an opening (not shown) in the conduit 18 and a conduit 34 wherein the elongated rod 40 is movable therethrough. Rod 40 is provided with a cleaning tip 42 at the lower end thereof, tip 42 being disposed for vertical movement through the conduit 34 and into the nozzle 36 for cleaning when the nozzle 36 becomes plugged.

The quenching device 16 is provided with a chamber portion 44 defined by transversely extending sidewalls 46 and 48 and a top wall 50 with a plurality of apertures (not shown) therein for receiving in sealing relation the conduits 34 therethrough. The sides of the walls 46 and 48 are of a preselected height so that the nozzles 36 are disposed above the gas stream flowing into the inlet 4 thereby reducing the contamination or plugging of the nozzles 36 due to the particulates in the flowing dirty gas stream flowing through the conduit 30.

The quenching device 16 is also provided with a wear liner 52, shown as brick, which is disposed along the bottom wall 51 thereof and extends angularly in a downwardly extending direction toward the inlet 4 into the scrubbing chamber 2. Furthermore, the inlet conduit 30 is provided on the lower surface thereof with an inwardly extending lip portion 54 at the connection with the quenching device 16, the lip 54 extending outwardly a short distance over the brick wear liner 52 and connected thereto by a vertically extending baffle 53.

In the operation of the quenching device of FIGS. 2, 3 and 4, a quenching solution is sprayed into the gas stream through the nozzle assemblies 32 which are spaced at preselected positions along the headers 18 and 20, respectively, so that each header covers or provides a water curtain substantially all the way across the flowing gas stream. Thus, only one header is necessary to be in operation in order to provide a good quenching zone for the hot, dirty gas.

Figure 5:
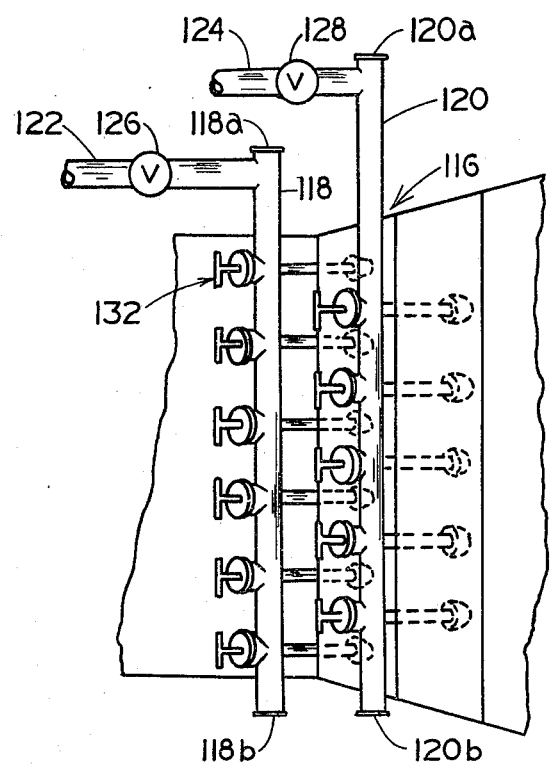
FIG. 5 is a plan view of another preferred quenching device of the present invention.
Figure 6:
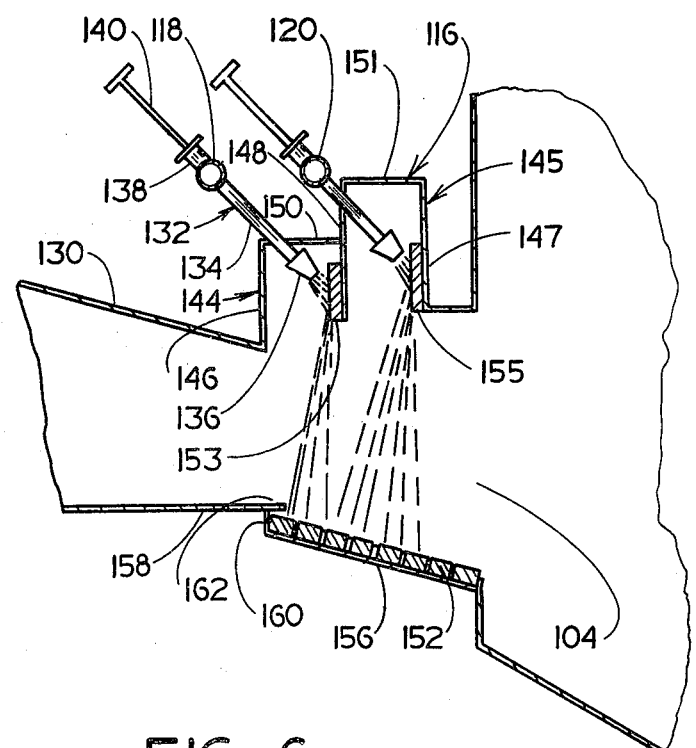
FIG. 6 is an elevational view of the quenching device shown in FIG. 5.

Referring now to the drawing as shown in FIGS. 5 and 6, a quenching device 116 is shown, the quenching device 116 including a pair of spray headers 118 and 120, respectively. Spray headers 118 and 120 are in flow communication with cooling water conduits 122 and 124, respectively, conduits 122 and 124 being in flow communication with a cooling water source (not shown). Valves 126 and 128 are provided in the conduits 122 and 124, respectively, valves 126 and 128 being disposed for controlling the flow through the headers 118 and or 120 for removing one of the headers 118 or 120 from service.

The headers 118 and 120 extend transversely of the quenching device 116 and a plurality of nozzle assemblies 132 are disposed therein to provide a uniform spray or a water curtain substantially across the flow of gases entering the quenching device 116 through the conduit 130. Headers 118 and 120 are also provided with flanges 118a and 118b and 120a and 120b on each end thereof. Flanges 118a and 118b and 120a and 120b are provided for easy removal and clean-out of headers 118 and 120.

The nozzle assemblies 132 include an angularly downwardly extending conduit portion 134 with a nozzle 136 at the lower extremity thereof. The upper portion of the assembly 132 includes a collar 138 with a cleaning rod 140 extending therethrough, rod 140 being in axial alignment with an opening (not shown) in the conduit 118 and a conduit 134 wherein the elongated rod 140 is movable therethrough. Rod 140 is generally provided with a cleaning tip (not shown) similar to cleaning tip 42 in FIG. 4 at the lower end thereof, the cleaning tip 42 being disposed for vertical movement through the conduit 134 and into the nozzle 136 for cleaning when the nozzle 136 becomes plugged.

The quenching device 116 is provided with a pair of chambers 144 and 145, respectively, chambers 144 and 145 having transversely extending outer opposed sidewalls 146 and 147 and an intermediate sidewall 148 disposed therebetween. Top walls 150 and 151 are also provided, wall 150 connecting walls 146 and 148 and wall 151 connecting walls 147 and 148. A plurality of apertures (not shown) are provided at preselected positions in walls 146 and 148 for receiving in sealing relation the conduits 134 therethrough. Walls 146, 147 and 148 extend downwardly a preselected distance so that the nozzles 136 are disposed above the gas stream flowing through the quenching device 116 to a scrubber (not shown) thereby reducing the contamination or plugging of the nozzles 136. Splash plates 153 and 155 are also provided on the lower extremities of walls 148 and 147, respectively, to provide good distribution of the quenching solution in forming a water curtain transverse of the flowing gases. Also, in combination with the angularly disposition of the nozzles 136 away from the flow of the gas stream minimizes plugging of the nozzles due to the particulates within the flowing dirty gas stream.

The quenching device 116 is also provided with a wear liner 152, shown as brick, which is disposed along the surface of the bottom wall 156 and extends angularly in a downwardly extending direction toward the inlet 104 into a scrubber (not shown). Bottom wall 156 is disposed beneath a bottom wall 158 of the conduit 130 and is connected thereto by a vertically extending baffle 160. Furthermore, the inlet conduit 130 is provided with an inwardly extending lip portion 162 on the wall 158 extending outwardly a short distance over the baffle 160.

In the operation of the quenching device of FIGS. 5 and 6, a quenching solution is sprayed into the gas stream through the nozzle assemblies 132 which are spaced at preselected positions along the headers 118 and 120, respectively, so that each header covers or provides a water curtain substantially all the way across the flowing gas stream. Thus, only one header is necessary to be in operation in order to provide a good quenching zone for the hot, dirty gas.

Figure 7:
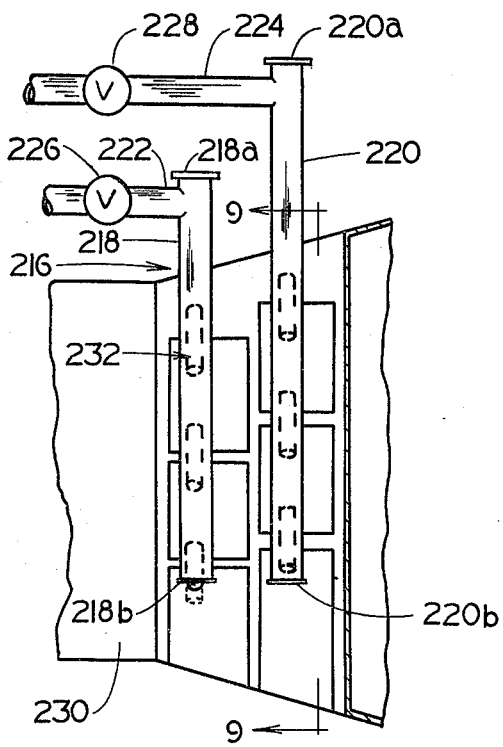
FIG. 7 is a plan view of even another preferred quenching device of the present invention.
Figure 8:
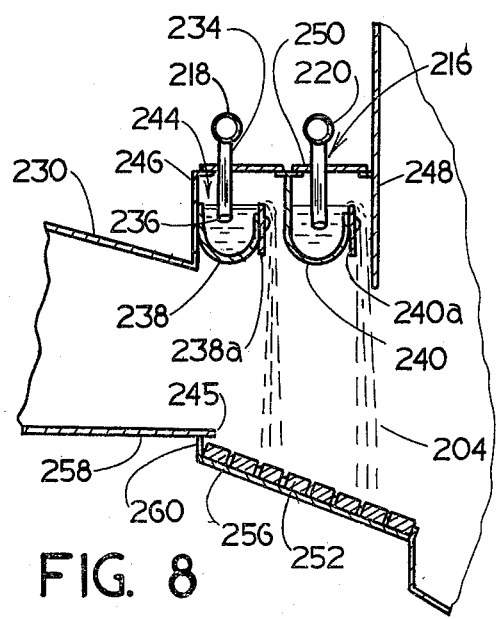
FIG. 8 is an elevational view of the quenching device shown in FIG. 7.
Figure 9:
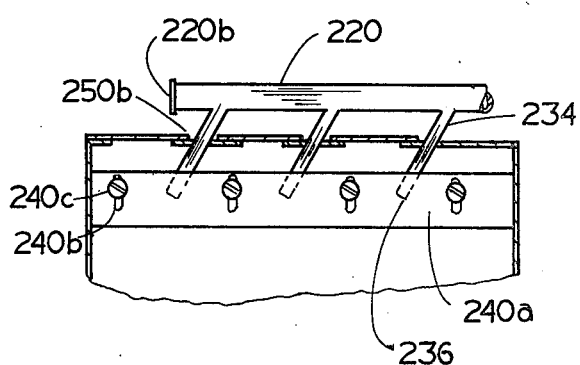
FIG. 9 is a fragmentary, sectional view of the quenching device shown in FIG. 7 taken substantially along line 9—9 of FIG. 7.

In FIGS. 7, 8 and 9, a quenching device 216 is shown, the quenching device 216 including a pair of spray headers 218 and 220, respectively. Spray headers 218 and 220 are in flow communication with cooling water conduits 222 and 224, respectively, conduits 222 and 224 being in flow communication with a cooling water source (not shown). Valves 226 and 228 are provided in the conduits 222 and 224, respectively, valves 226 and 228 being disposed for controlling flow to the headers 218 and 220 or for removing one of the headers 218 or 220 from service.

The headers 218 and 220 extend transversely of the quenching device 216 and a plurality of nozzle assemblies 232 are disposed therein to provide a uniform spray for a water curtain substantially across the flow of gases entering the quenching device 216 through the conduit 230. Headers 218 and 220 are also provided with flanges 218a and 218b and 220a and 220b on each end thereof, respectively. Flanges 218a and 218b and 220a and 220b are provided for easy removal and cleanout of the headers 218 and 220.

The nozzle assemblies 232 include an angularly downwardly extending conduit portion 234 with an opening 236 at the lower extremity thereof.

A pair of troughs 238 and 240 are disposed transversely of the quenching device 216, the troughs 238 and 240 being of generally U-shaped construction with adjustable weirs 238a and 240a extending along one side of the troughs 238 and 240, respectively. The weirs 238a and 240a are generally a flat metal plate with elongated slots therein, slots 240b of weir 240a being shown in FIG. 9. The weirs 238a and 240a are attached by elongated threaded adjustable members, adjustable members 240c being shown in FIG. 9 for the weir 240a.

The quenching device 216 is provided with a chamber portion 244 defined by transversely extending opposed side walls 246 and 248 with a top wall 250 disposed and connected therebetween. Top wall 250 is provided with a plurality of elongated slots 250b therein for receiving conduits 234 therethrough, slots 250b being disposed at preselected positions in the wall 250. The sides of the walls 246 and 248 extend downwardly a preselected distance so the troughs 238 and 240 are disposed above the gas stream flowing into the quenching device 216 thereby reducing interference with the flow of gases through the quenching device 216 as well as minimizing the contamination of particulate materials into the troughs 238 and 240 thereby plugging the conduits 234.

The quenching device 216 is also provided with a wear liner 252, shown as brick, which is disposed along the surface of the bottom wall 256 and extends angularly in a downwardly extending direction toward the inlet 204 into a scrubbing unit (not shown). Bottom wall 256 is disposed beneath a bottom wall 258 of the conduit 230 and is connected thereto by a vertically extending baffle 260. Furthermore, the inlet conduit 230 is provided with an inwardly extending lip portion 245 on the wall 258 extending outwardly a short distance over the baffle 260.

In the operation of the quenching device of FIGS. 7, 8 and 9, a quenching solution is added to the troughs 238 and 240 through the conduits 234 with the adjustable weirs 238a and 240a being positioned at a preselected height. As the troughs 238 and 240 fill the solution then overflows the weirs 238a and 240a thereby forming a transversely extending water curtain across the quenching device 216 wherein all of the incoming waste gas entering the quenching device 216 through duct 230 passes through the water curtain. It is realized that either one or two water curtains may be available for use at a time, only one water curtain generally being necessary for creating an acceptable wet/dry zone.

Figure 10:
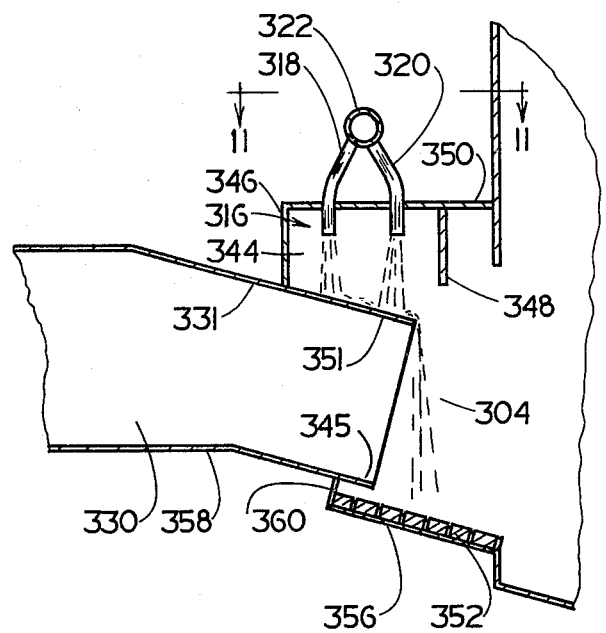
FIG. 10 is an elevational view of another preferred quenching device of the present invention; and, FIG. 11 is a view of the quenching device shown in FIG. 10 taken substantially along line 11—11 of FIG. 10.
Figure 11:
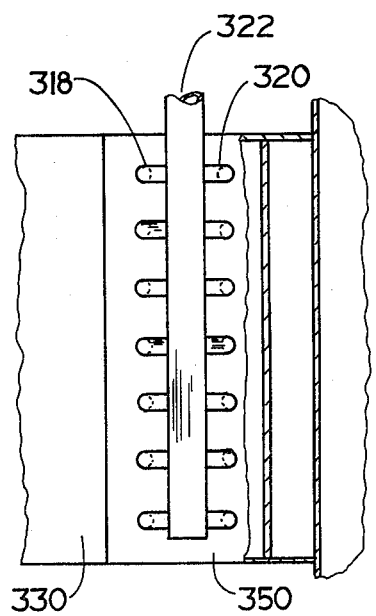

In FIGS. 10 and 11, a quenching device 316 is shown, the quenching device 316 including two rows of spray assemblies 318 and 320, respectively. Spray assemblies 318 and 320 are in flow communication with a cooling water conduit 322, conduit 322 being in flow communication with a cooling water source (not shown). The two rows of spray assemblies 318 and 320 extend transversely of the quenching device 316 and in each row the spray assemblies are spaced equidistance apart to provide a uniform spray or a water curtain substantially across the flow of gases entering the quenching device 316 through the conduit 330.

The quenching device 316 is provided with a chamber portion 344 defined by transversely extending opposed side walls 346 and 348 with a top wall 350 disposed and connected therebetween and bottom wall 351. Top wall 350 is provided with a plurality of openings therein (not shown) for receiving the spray assemblies 318 and 320 therethrough. Bottom wall 351 of chamber portion 344 extends angularly in a downwardly extending direction towards an inlet 304 into a scrubbing unit (not shown). The lower wall 351 is connected at its upper end to the vertical wall 346 and an upper wall 331 of the conduit 330.

The quenching device 316 is also provided with a wear liner 352, shown as brick, which is disposed along the surface of a bottom wall 356, bottom wall 356 extends angularly in a downwardly extending direction toward the inlet 304. Bottom wall 356 is disposed beneath a bottom wall 358 of the conduit 330 and is connected thereto by vertically extending baffle 360. Furthermore, the inlet conduit 330 is provided with an inwardly extending lip portion 345 on the wall 358 extending outwardly a short distance over the baffle 360.

In the operation of the quenching device of FIGS. 10 and 11, a quenching solution is added through the spray assemblies 318 and 320 through the conduit 322 with the spraying solution spraying downwardly onto the upper surface of the bottom wall 351 of chamber portion 344. By spacing the spray assemblies 318 and 320 in two parallel rows with the assemblies in each row being spaced approximately equidistance apart and extending the entire width of the conduit, a transversely extending water curtain across the quenching device 316 is obtained. The two rows of assemblies 318 and 320 are preferred since if during use an assembly in a row plugs, the aligned spray assembly in the opposed row is still in operation thereby continuing the addition of quenching solution at the preselected position, without affecting water curtain.

It will be realized that various changes may be made to the specific embodiment shown and described without departing from the principles and scope of the present invention.

What is claimed is:

1. A quenching device for a hot, dirty gas stream comprising:

a housing having a gas inlet and a gas outlet;

a flow-through duct in fluid communication with said gas inlet at one end and a hot, dirty gas source at the opposed end;

a transversely disposed cooling water source means mounted generally above said flow-through duct, said cooling water source means including means to provide a water curtain of uniform density across the quenching device;

said housing including a lower wall disposed beneath and connected to a lower wall of said duct with a vertically extending baffle therebetween, the lower wall of said housing communicating with said gas inlet; and, a chamber portion within said housing, said chamber portion surrounding said cooling water source means, said cooling water source means including vertically extending spray means, said chamber having vertically extending sides terminating at a lower extremity a preselected distance below the lower extremity of said spray means, said chamber portion being provided with a bottom wall connecting with one of the vertically extending sides and top wall of said duct; the bottom wall of said chamber portion extending angularly in a downwardly direction whereby water from said cooling water source means is directed onto the upper surface of said chamber bottom wall to flow in a curtain across the outlet from said duct in the quenching device.

2. The quenching device of claim 1, said lower wall of said duct having a lip extending over said baffle.

3. The quenching device of claim 1 including a chamber portion within the upper portion of said housing, said chamber surrounding said cooling water source means, said chamber having opposed vertically extending sides with a top wall connected therebetween, one of said side walls connecting with a top wall of said duct, said chamber being provided with a bottom wall connecting with said one of said side walls and said top wall of said duct, said chamber bottom wall extending angularly in a downwardly direction toward said gas outlet whereby water from said cooling water source means is directed onto the upper surface of said chamber bottom wall.

* * * * *